3,063,894
ARYLSULFINYL HALOALKANENITRILE PESTICIDES
Samuel Allen Heininger, Warson Woods, Mo., and Gail H. Birum, Dayton, Ohio, assignors to Monsanto Chemical Company, St. Louis, Mo., a corporation of Delaware
No Drawing. Original application Dec. 31, 1957, Ser. No. 706,238, now Patent No. 3,018,304, dated Jan. 23, 1962. Divided and this application Apr. 21, 1961, Ser. No. 104,521
6 Claims. (Cl. 167—30)

This invention relates to toxic arylsulfinyl haloalkanenitriles and more particularly to methods for the control of microorganisms using these nitriles and certain novel compositions comprising these nitriles which are highly toxic to microorganisms such as bacteria and fungi. This application is a division of copending application Serial No. 706,238, filed December 31, 1957, now U.S. Patent No. 3,018,304.

The novel compounds of the invention are arylsulfinyl haloalkanenitriles of the formula

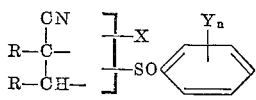

wherein R is selected from the class consisting of hydrogen and hydrocarbon radicals free of aliphatic unsaturation containing from 1 to 6 carbon atoms, providing at least one R is hydrogen. The term "free of aliphatic unsaturation" includes aryl, alkyl and cycloalkyl radicals only in this case, since hydrocarbon radicals are limited to from 1 to 6 carbon atoms and by the term "free of aliphatic unsaturation" olefinic and acetylenic unsaturation is excluded. X represents a halogen atom taken from the class consisting of chlorine and bromine. Y is selected from the class consisting of chlorine, bromine, iodine, fluorine, hydrogen and alkyl radicals having from 1 to 6 carbon atoms, and $n$ is an integer from 1 to 5.

It is an object of this invention to provide new compounds which are arylsulfinyl haloalkanenitriles.

It is another object of this invention to provide new and effective biological toxicant compositions which have as an effective ingredient therein arylsulfinyl haloalkanenitriles.

It is a further object of the invention to provide a method of inhibiting the growth of undesirable microorganisms by the application of the inventive arylsulfinyl haloalkanenitriles to these microorganisms.

These and other objects of the invention will become apparent as the detailed description of the invention proceeds.

There are shown below a number of specific new compounds of the invention. It is not intended that this be a complete listing of all of the compounds of the invention but that it merely be illustrative thereof. The following are a listing of a number of the arylsulfinyl chloroalkanenitriles: 3 - (phenylsulfinyl) - 2 - chloropropionitrile, 2-(phenylsulfinyl) - 3 - chloropropionitrile, 3 - (2 - chlorophenylsulfinyl) - 2 - chloropropionitrile, 3 - (3 - chlorophenylsulfinyl)-2-chloropropionitrile, 3-(4 - chlorophenylsulfinyl) - chloropropionitrile, 2 - ( 2 - chlorophenylsulfinyl) - 3 - chloropropionitrile, 2 - (3 - chlorophenylsulfinyl-3-chloropropionitrile, 2-(4-chlorophenylsulfinyl) - 3- chloropropionitrile, 3 - (2,4 - dichlorophenylsulfinyl)-2-chloropropionitrile, 2 - (2,4 - dichlorophenylsulfinyl) - 3-chloropropionitrile; 3 - (pentachlorophenylsulfinyl - 2-chloropropionitrile, 2 - (pentachlorophenylsulfinyl) - 3-chloropropionitrile, etc.

An examination of the above-listed compounds only as to nuclear substitution indicates that not every one of the possible novel compounds of the invention is named specifically. For example only one of the dichloroisomers is named, no trichloro and no tetrachloro compounds are named. Nevertheless, it is intended to cover all these compounds as well as others covered by the general formula but not specifically named.

The following is a non-limiting listing of a number of the new arylsulfinyl bromoalkanenitriles: 3-(phenylsulfinyl)-2-bromopropionitrile, 2 - (phenylsulfinyl)-3-bromopropionitrile, 3 - (2 - bromophenylsulfinyl) - 2 - bromopropionitrile, 3 - (3 - bromophenylsulfinyl) - 2 - bromopropionitrile, 3 - (4 - bromophenylsulfinyl) - 2 - bromopropionitrile, 2 - (2 - bromophenylsulfinyl - 3 - bromopropionitrile, 2 - (3 - bromophenylsulfinyl) - 3 - bromopropionitrile, 2 - (4 - bromophenylsulfinyl) - 3 - bromopropionitrile; 3-(2,4-dibromophenylsulfinyl) - 2 - bromopropionitrile, 2-(2,4-dibromophenylsulfinyl) - 3 - bromopropionitrile; 3 - (pentabromophenylsulfinyl) - 2 - bromopropionitrile, 2 - (pentabromophenylsulfinyl) - 3 - bromopropionitrile, etc.

It is also intended to cover bromo- or chlorophenylsulfinyl chloro- or bromopropionitriles and the following are a non-limiting list thereof: 2- (4 - bromophenylsulfinyl) - 3 - chloropropionitrile, 3 - (2 - chlorophenylsulfinyl)-2- bromopropionitrile, 3- (2 - bromo - 4 - chlorophenylsulfinyl) - 2 - bromopropionitrile, 2-(2,4-dibromo-3-chlorophenylsulfinyl) - 3 - chloropropionitrile, 3 - (pentabromophenylsulfinyl)-2-chloropropionitrile, etc.

Some of the novel compounds of the invention of the iodophenylsulfinyl halopropionitrile type are shown in the following non-limiting list: 3 - (2 - iodophenylsulfinyl)-2-chloropropionitrile, 2 - (4 - iodophenylsulfinyl)-3-bromopropionitrile, 3 - (2,4 - diiodophenylsulfinyl) - 2 - chloropropionitrile, 2 - (3,4 - diiodophenylsulfinyl) - 3-bromopropionitrile, 3 - (2,3 - diiodophenylsulfinyl) - 2 - chloropropionitrile, 2 - (2 - iodo - 4-bromophenylsulfinyl)-3-chloropropionitrile, etc.

For a non-limiting listing of hte fluorophenylsulfinyl halopropionitriles, the following are named: 3-(4-fluorophenylsulfinyl)-2-bromopropionitrile, 2 - (2-fluoro-3-iodo-4-bromophenylsulfinyl)-3-chloropropionitrile, etc.

The alkylphenylsulfinyl halopropionitriles are shown specifically in the following non-limiting list: 2-(4-tolylsulfinyl)-3-chloropropionitrile, 3-(3,5-diethylphenylsulfinyl)-2-bromopropionitrile, 2-(2-methyl-4-chlorophenylsulfinyl) - 3 - bromopropionitrile, 3 - (2,4 - dichloro-5-ethylphenylsulfinyl)-2-bromopropionitrile, 2-(4-n-hexylphenylsulfinyl)-3-chloropropionitrile, etc.

Referring now to the broad formulas above of the inventive compounds, some compounds are shown where R is other than hydrogen to give a non-limiting list as follows: 2-(2-iodophenylsulfinyl) - 2 - methyl - 3 - chloropropionitrile, 3 - (2,4 - dimethylphenylsulfinyl-3-phenyl-2-bromopropionitrile, 3 - (4 - chlorophenylsulfinyl)-2-cyclohexyl - 2 - chloropropionitrile, etc.

Other compounds which are not covered by the general formula above but which can be prepared in a similar manner are the naphthylsulfinyl halopropionitriles, e.g., 2 - (β - naphthylsulfinyl) - 3 - bromopropionitrile, 3 - (β-bromo-α-naphthylsulfinyl) - 2 - chloropropionitrile, and similar compounds.

The novel compounds of the invention are prepared by the controlled oxidation of the corresponding sulfides, using $H_2O_2$ in acetic acid, $HNO_3$ in acetic anhydride, or similar oxidizing agents. Particularly in the case of the use of $H_2O_2$ in acetic acid, care must be taken not to carry the oxidation to sulfones but rather the oxidation is stopped at the intermediate stage for producing sulfoxides. The sulfides can be readily prepared by a variety of methods including addition of alkyl- or haloarenesulfenyl chlorides or bromides to acrylonitrile to give mixtures of 3-(or 2)-halo-2-(or 3)-(substituted phenylthio)- propionitriles, addition of alkyl- or halo-substituted thiophenols to α-haloacrylonitriles to give 2-halo-3-(substituted phenylthio)propionitriles, addition of hydrogen halide to the olefinic unsaturation of a 2- or 3-(substituted phenylthio)acrylonitrile, reaction of 2,3-dihalopropionitrile with an alkali metal salt of a substituted thiophenol, and by other methods obvious to those skilled in the art. The preparation of such sulfides by several of the above detailed methods and their oxidation to sulfoxides of the type disclosed herein will be illustrated by the specific examples shown below.

*Example 1*

This example illustrates the preparation of 3-(4-chlorophenylsulfinyl)-2-chloropropionitrile.

The sulfide is made in the following manner: To a solution of 43.3 g. (0.3 mole) of p-chlorothiophenol in 75 ml. of dioxane containing 5 ml. of 50% aqueous choline (2-hydroxyethyltrimethylammonium hydroxide) was added 26.3 g. (0.3 mole) of α-chloroacrylonitrile. There was an immediate exothermic reaction during the addition, and the reaction mixture temperature was held at 35–40° C. by cooling. After addition was complete, the reaction mixture was stirred for one-half hour at 30–40° C., and poured into ice water. The oil which separated was extracted with ether, dried, and the ether removed by evaporation. On distillation, there was collected 55 g. (79% yield) of 3-(4-chlorophenylthio)-2-chloropropionitrile as a yellow liquid, B.P. 147–148° C./0.6 mm., $n_D^{25}$ 1.5885, analyzing correctly for $C_9H_7Cl_2NS$ and having an α-chloro structure by infrared analysis. On standing, the oil solidified; a sample recrystallized from ethanol had M.P. 39–40° C.

In a beaker was placed 5.8 g. (0.025 mole) of the 3-(4-chlorophenylthio)-2-chloropropionitrile prepared above. To it was added 20 ml. of glacial acetic acid and the mixture was heated until solution was obtained. Then at 50° C. addition was begun of 11.3 g. of 30% $H_2O_2$. No visible reaction occurred, i.e. it did not appear to be exothermic, but after about two-thirds of the hydrogen peroxide had been added, an oil formed in the reaction mixture. Another 20 ml. of acetic acid was added giving solution again and the addition of hydrogen peroxide was completed at 50–60° C. The reaction mixture was kept at 50–60° C. for one-half hour, then the reaction mixture was warmed to 90° C. at which time a color began to develop. The reaction mixture was poured into ice water and allowed to stand overnight during which a white solid precipitated. The solid was filtered off and recrystallized from ethyl alcohol to give small white needles having a melting point of 109°–110° C. A second recrystallization from absolute ethyl alcohol gave material having a melting point of 111.5°–112° C., which had the following elemental analysis:

|  | Found | Calc'd for $C_9H_7Cl_2NOS$ |
|---|---|---|
| Percent: |  |  |
| C | 43.04 | 43.5 |
| H | 3.14 | 2.84 |
| Cl | 27.67 | 28.6 |
| N | 5.61 | 5.64 |
| S | 12.53 | 12.9 |

*Example 2*

This example illustrates another method of preparing 3-(4-chlorophenylsulfinyl)-2-chloropropionitrile.

In a two-liter flask was placed 289 grams (2 moles) of p-chlorothiophenol and a solution of 80 grams (2 moles) of sodium hydroxide in 800 ml. of water was added with cooling in an ice bath. Then over a period of two hours 247.5 grams (2 moles) of 2,3-dichloropropionitrile was added keeping the temperature between 15° and 20° C. throughout the addition. The reaction mixture was stirred for one hour longer and allowed to stand overnight. The product had solidified to small pellets which were filtered, washed and recrystallized from three liters of ethanol. The solid product crystallized in fine white needles which melted at 42°–43° C.; a total of 203 grams was recovered in the first crop of crystals. Concentration of the filtrate and dilution gave a second crop of crystals of 128 grams and having a melting point of 40°–41° C., and yet a third crop of 32 grams of product was recovered on retreating the filtrate in the same manner. The total yield was 363 grams (78.3%). An elemental analysis of the 3-(4-chlorophenylthio)-2-chloropropionitrile product gave the following results:

|  | Found | Calc'd for $C_9H_7Cl_2NS$ |
|---|---|---|
| Percent: |  |  |
| C | 47.2 | 46.6 |
| H | 2.9 | 3.0 |
| N | 5.7 | 6.0 |
| Cl | 30.4 | 20.5 |
| S | 14.1 | 13.8 |

A sample of 20 ml. of acetic anhydride was cooled to 100° C. and 7 ml. of fuming nitric acid was added with stirring. This solution was then added cautiously to 23.2 g. (0.1 mole) of 3-(4-chlorophenylthio)-2-chloropropionitrile (preparation of which is described immediately above), dissolved in 100 ml. of acetic anhydride. The temperature of the reaction mixture was controlled during the addition of the oxidizing agent below 15° C. by gradual addition and external cooling. During the mixing the solution turned dark green. The mixture was allowed to stand for three hours at 10°–15° C., then poured into ice water. The green color disappeared giving a yellow oil which quickly solidified. The lumps were broken up, washed with water and dried. The solid was bright yellow in color and weighed 19.7 grams. The crude product was recrystallized from ethyl alcohol giving 10.4 grams of white needles having a melting point of 116°–117° C. An infrared spectrometer examination of the purified product showed it to be pure sulfoxide with no showing of sulfone band—the sulfoxide band being very strong. The sulfoxide of Example 1 was clearly a crude product contaminated somewhat with sulfone. An elemental analysis of 3-(4-chlorophenylsulfinyl)-2-chloropropionitrile product of this example gave the following results:

|  | Found | Calc'd for $C_9H_7Cl_2NOS$ |
|---|---|---|
| Percent: |  |  |
| C | 43.6 | 43.5 |
| H | 2.7 | 2.8 |
| Cl | 28.5 | 28.6 |
| N | 5.5 | 5.6 |
| S | 13.1 | 12.9 |

The compound 3-(phenylsulfinyl)-2-chloropropionitrile is prepared by exactly the same method replacing the p-chlorothiophenol reactant with an equimolar amount of thiophenol.

*Example 3*

This example illustrates the preparation of 3-(phenylsulfinyl)-2-chloropropionitrile.

3-phenylthio-2-chloropropionitrile was prepared by the choline-catalyzed addition of thiophenol α-chloroacrylonitrile to give an 85% yield, M.P. 115–116° C./0.3 mm., $n_D^{25}$ 1.5762. An elemental analysis of this product gave the following results:

|  | Found | Calc'd for $C_9H_8ClNS$ |
|---|---|---|
| Percent: |  |  |
| C | 55.29 | 54.7 |
| H | 4.1 | 4.1 |
| Cl | 17.4 | 18.0 |
| N | 6.74 | 7.1 |
| S | 16.8 | 16.2 |

In a manner similar to that described in Example 2 herein, the 3-phenylthio-2-chloropropionitrile is then oxidized using fuming nitric acid in acetic anhydride to produce the desired 3-phenylsulfinyl - 2 - chloropropionitrile product.

*Example 4*

This example illustrates the preparation of 2-methyl-2-(p-tolylsulfinyl)-3-chloropropionitrile.

A sample of 13.4 g. (0.2 mole) of methacrylonitrile, i.e. (2-methylacrylonitrile) was placed in a flask and 100 ml. of glacial acetic acid was added. Then 31.7 g. (0.2 mole) of p-toluenesulfenyl chloride was added to the flask. No reaction was apparent, so the contents of the flask were slowly warmed to 70° C. and a gradual lightening of the color of the reaction mixture occurred over a period of 30 minutes to give a product having a clear, bright yellow color. The original reaction mixture before heating was a deep red. Acetic acid was stripped off under reduced pressure and distillation of the product begun. After a small amount of orange forerun there was collected 30.5 g. (67.7%) of a bright yellow liquid, B.P. 122–124° C./0.2 mm. $n_D{}^{25}$ 1.5581.

The infrared spectrum of this product shows a medium intensity nitrile single band and no doublet. This suggests only a single isomer resulting from addition of the sulfenyl chloride to the olefinic double bond of a methacrylonitrile and no conjugated unsaturated product present. An elemental analysis of the product gave the following information:

| | Found | Calc'd for $C_{11}H_{12}ClNS$ |
|---|---|---|
| Percent: | | |
| C | 58.82 | 58.6 |
| H | 5.69 | 5.26 |
| Cl | 16.06 | 15.75 |
| N | 5.94 | 6.22 |
| S | 14.45 | 14.2 |

The two possible isomers which may be formed from the addition of p-toluenesulfenyl chloride to methacrylonitrile are: (I) 2-methyl-3-(p-methylphenylthio)-2-chloropropionitrile; and (II) 2-methyl-2-(p-methylphenylthio)-3-chloropropionitrile. Product (I) has an alpha chlorine atom and its infrared spectrum should not show the nitrile band which the adduct actually produced does show. Also, product (I) should dehydrochlorinate readily whereas product (II) cannot. Since no unsaturation was present in the adduct prepared, as indicated by the infrared analysis, and since the nitrile band is relatively strong, it appears that this adduct is the single isomer (II). This is also in agreement with what would be expected as a result of steric and electronic considerations.

In an additional experiment to prove the particular sulfide structure, 1.0 g. of the sulfide of this example was placed in a beaker, dissolved in ethyl ether, and 2 ml. of triethylamine was added. N reaction occurred and no precipitate formed. The reaction mixture was heated on a steam bath and still no amine hydrochloride formed. Further heating was continued until all the ethyl ether was driven off and longer. The residue, when treated again with ethyl ether, gave only a trace of fluffy or flocculent solid. Hence, at 100° C., no dehydrochlorination has occurred and even with a base present. This experiment supports the structure (II) as set forth above.

A sample of 4 ml. of acetic anhydride is cooled to 10° C. and 7 ml. of fuming nitric acid is added with stirring. This solution is then added slowly to 4.5 g. (0.02 mole) of the 2-methyl-2-(4-methylphenylthio)-3-chloropropionitrile prepared as above which is dissolved in 20 ml. of acetic anhydride. The temperature of the reaction mixture is maintained during addition of the oxidizing agent below 15° C. by gradual addition and cooling. The mixture is then allowed to stand for several hours at 10°–15° C. after which time it is poured into ice water. From the crude product a crystalline, pure 2-methyl-2-(4-methylphenylsulfinyl) - 3 - chloropropionitrile is recovered by crystallization and recrystallization from ethyl alcohol.

*Example 5*

This example illustrates the preparation of a mixture of sulfoxides containing 2-(4-chlorophenylsulfinyl)-3-chloropropionitrile as well as 3-(4-chlorophenylsulfinyl)-2-chloropropionitrile and dehydrohalogenation products thereof.

A mixture of 35.8 g. (0.2 mole) of p-chlorobenzenesulfenyl chloride and 10.6 g. (0.2 mole) of acrylonitrile in 100 ml. of glacial acetic acid was refluxed for two hours. The color of the mixture turned from red to yellow in the first 15 minutes of reflux. Some HCl evolution will normally be observed in carrying out this reaction. After standing overnight at room temperature the reaction mixture was poured into 500 ml. of water to give a cloudy, viscous orange oil. The oil was extracted with a mixture of equal volumes of benzene and hexane and the extract was washed with water until it was free of acid. Then the orange solution was distilled. After removal of the solvent there was obtained 27.7 g. of yellow viscous liquid product, $n_D{}^{25}$ 1.5914, B.P. 180°–190° C./15 mm.

The product of this reaction of p-chlorobenzenesulfenyl chloride and acrylonitrile is a complex mixture containing probably 3 or 4 compounds. Infrared analysis of this mixture showed two types of nitrile bands. When the sulfide mixture was oxidized vigorously with $H_2O_2$, there was removed therefrom a 30% yield of a sulfone M.P. 92–93° C. This sulfone was proved to be 3-(4-chlorophenylsulfonyl)-2-chloropropionitrile by comparison by a mixed melting point with the sulfone made from the sulfide of Example 1 by a more severe oxidation than that needed to produce the sulfoxide. When forcing conditions in the oxidation were attempted dehydrohalogenation of the sulfone occurred and up to almost 20% yield of a chlorophenylsulfonylacrylonitrile was obtained. As a result of these experiments it was concluded that the reaction mixture of acrylonitrile with p-chlorobenzenesulfenyl chloride consists of a mixture of primarily 2-(4-chlorophenylthio) - 3 - chloropropionitrile and 3-(4-chlorophenylthio)-2-chloropropionitrile together with 3- and/or 2 - (4 - chlorophenylthio)-acrylonitrile. This method of producing specific sulfides is not particularly desirable except when a mixture is desired since the individual sulfides are difficult to separate.

A sample of 20 ml. of acetic anhydride is cooled to 10° C. and 7 ml. of fuming nitric acid is added with stirring. This solution is then added cautiously to 23.2 g. of the p-chlorobenzenesulfenyl chloride and acrylonitrile reaction product of this Example 5, the reaction product having been previously dissolved in 100 ml. of acetic anhydride. The temperature of the reaction mixture is maintained during the addition of the oxidizing agent below 15° C. by gradual addition and external cooling. The mixture is then allowed to stand for three hours at 10°–15° C. and poured into ice water. The crude sulfoxide which is a mixture of sulfoxides containing 2-(4-chlorophenylsulfinyl)-3-chloropropionitrile as well as 3-(4-chlorophenylsulfinyl)-2-chloropropionitrile and dehydrohalogenation products thereof is separated and purified by conventional means. This method of producing sulfoxides is not desirable normally unless a mixture is desired, since the particular sulfoxides are difficult to separate one from the other.

*Example 6*

For the evaluation of the bacteriostatic and fungistatic effects of these new compounds, the sulfoxide of Example 2 was chosen, namely the compound 3-(4-chlorophenylsulfinyl)-2-chloropropionitrile. This compound was mixed in predetermined concentrations with hot sterile agar which was subsequently poured into Petri dishes, cooled, and allowed to harden. Nutrient agar containing the test compound was then inoculated with the bacteria *Micrococcus pyogenes* var. *aureus* and *Salmonella typhosa*, and Sabouraud's dextrose agar containing the test compound was inoculated with the fungus organism *Aspergillus niger*. The bacteria were incubated for two days at 37° C., the fungi at 25° C. for 5 days.

These tests showed inhibition of growth of the *Micrococcus pyogenes* at down to one part per million concentration of the sulfoxide and inhibition of the growth of *Salmonella typhosa* and *Aspergillus niger* down to 10 parts per million concentration of the sulfoxide. Thus, it is seen that these materials are extremely potent bacteriostats and fungistats. Usually these novel compounds will be applied as bacteriostats or fungistats at concentrations in the range of 0.0001% to 1.0%, preferably 0.001% to 0.1% suspended, dispersed or dissolved in an inert carrier.

The new compounds of this invention may be applied directly to the microorganism which it is wished to destroy or may be compounded in an emulsion or other form with inert carriers for application. These compounds of the invention may also be useful as active ingredients in nematocidal, insecticidal, miticidal, fungicidal and herbicidal compositions and applications.

Although the invention has been described in terms of specified embodiments which are set forth in considerable detail, it should be noted that this is by way of illustration only and that the invention is not necessarily limited thereto since alternative embodiments will become apparent to those skilled in the art in view of the disclosure. Accordingly, modifications are contemplated which can be made without departing from the spirit of the described invention.

What is cliamed is:

1. The method of inhibiting the growth of undesired bacteria and fungi which comprises exposing said bacteria and fungi to a toxic amount of an arylsulfinyl haloalkanenitrile of the formula

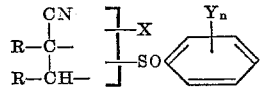

wherein R is selected from the class consisting of hydrogen and hydrocarbon radicals free of aliphatic unsaturation and containing from 1 to 6 carbon atoms, provided at least one R is hydrogen, X represents a halogen atom taken from the class consisting of chlorine and bromine, Y is selected from the class consisting of chlorine, bromine, iodine, fluorine, hydrogen and alkyl radicals having from 1 to 6 carbon atoms, and $n$ is an integer from 1 to 5.

2. The method of inhibiting the growth of undesired bacteria and fungi which comprises exposing said bacteria and fungi to a toxic amount of an arylsulfinyl haloalkanenitrile of the formula

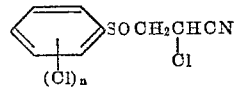

wherein $n$ is an integer from 1 to 5.

3. The method of inhibiting the growth of undesired bacteria and fungi which comprises exposing said bacteria and fungi to a toxic amount of 3-(4-chlorophenylsulfinyl)-2-chloropropionitrile.

4. The method of inhibiting the growth of undesired bacteria and fungi which comprises exposing said bacteria and fungi to a toxic amount of an arylsulfinyl haloalkanenitrile of the formula

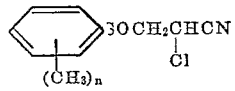

wherein $n$ is an integer from 0 to 2 inclusive.

5. The method of inhibiting the growth of undesired bacteria and fungi which comprises exposing said bacteria and fungi to a toxic amount of 2-(p-toluenesulfinyl)-2-methyl-3-chloropropionitrile.

6. The method of inhibiting the growth of undesired bacteria and fungi which comprises exposing said bacteria and fungi to a toxic amount of 3-phenylsulfinyl-2-chloropropionitrile.

References Cited in the file of this patent

UNITED STATES PATENTS 2,819,197   Santmyer _____ Jan. 7, 1958

UNITED STATES PATENT OFFICE
CERTIFICATE OF CORRECTION

Patent No. 3,063,894 November 13, 1962

Samuel Allen Heininger et al.

It is hereby certified that error appears in the above numbered patent requiring correction and that the said Letters Patent should read as corrected below.

Column 1, line 62, before "chloropropionitrile" insert -- 2- --; column 2, line 38, for "hte" read -- the --; column 3, line 70, for "dded" read -- added --; column 4, line 22, for "100° C." read -- 10° C. --; line 63, after "thiophenol" insert -- to --; column 5, line 58, for "N" read -- No --; column 7, line 36, for "cliamed" read -- claimed --; column 8, line 11, before "fungi" insert -- and --.

Signed and sealed this 28th day of May 1963.

(SEAL)
Attest:

ERNEST W. SWIDER
Attesting Officer

DAVID L. LADD
Commissioner of Patents